United States Patent [19]

Bompard et al.

[11] 4,354,888
[45] Oct. 19, 1982

[54] PROCESS AND MACHINE FOR MANUFACTURING PIECES OF REVOLUTION MADE OF THREE-DIMENSIONAL MATERIAL OF WHICH THE GENERATRIX HAS AT LEAST ONE CONCAVE PART

[75] Inventors: Bruno Bompard; Alain Bruyere, both of Lyons, France

[73] Assignees: Commissariat a l'Energie Atomique, Paris; Societe J. Brochier & Fils., Villeurbanne, both of France

[21] Appl. No.: 252,324

[22] Filed: Apr. 9, 1981

[30] Foreign Application Priority Data

Apr. 11, 1980 [FR] France ............................... 80 08178

[51] Int. Cl.³ .......................................... B65H 81/00
[52] U.S. Cl. .................................... 156/175; 156/425; 156/433
[58] Field of Search ............... 156/175, 425, 172, 169, 156/161, 165, 440, 173, 162; 242/7.02, 7.21, 7.22

[56] References Cited

U.S. PATENT DOCUMENTS 4,080,915  3/1978  Bompard et al. ................. 242/7.21

FOREIGN PATENT DOCUMENTS 1460058 10/1965 France .
2315562  1/1977 France .
2408676  6/1979 France .

*Primary Examiner*—Michael W. Ball
*Attorney, Agent, or Firm*—Kerkam, Stowell, Kondracki & Clarke

[57] ABSTRACT

The present invention relates to a process for manufacturing pieces of revolution made of three-dimensional material, of which the generatrix has at least one concave part, said process consisting in making a support mandrel provided with rows of pins defining therebetween longitudinal corridors and circumferential corridors, in disposing superposed layers of yarns in said corridors by winding and by filling, in densifying the assembly thus obtained, and, finally, in eliminating the support mandrel, wherein the longitudinal yarns are deposited in corresponding corridors and these yarns are maintained in the corridors at the level of said concave part. The invention also relates to a machine for carrying out this process.

6 Claims, 3 Drawing Figures

PROCESS AND MACHINE FOR MANUFACTURING PIECES OF REVOLUTION MADE OF THREE-DIMENSIONAL MATERIAL OF WHICH THE GENERATRIX HAS AT LEAST ONE CONCAVE PART

The present invention relates to a process for manufacturing bodies or pieces of revolution from a three-dimensional material more particularly adapted for manufacturing pieces of which the generatrix has at least one concave part, as well as to a machine for carrying out this process industrially. Such a process may be applied in particular to the manufacture of pieces of electrical insulators made of silica fibres and resin, of pieces of disconnecting switches for very high intensity currents, made of glass fibres. It may also be used in the automobile and aeronautic sectors, particularly for manufacturing brake and clutch elements and for making the walls of combustion chambers and the pistons of automobile vehicles.

More precisely, the invention relates to an improvement to the process of manufacture described and claimed in French Pat. No. 2 408 676 filed on Sept. 23, 1977 in the name of the Commissariat à l'Energie Atomique. The process described in this patent application makes it possible to make bodies or pieces of any geometrical form from a three-dimensional material embedded in a resin, this material being able to be of considerable thickness. The material constituting the piece thus produced comprises three series of yarns disposed in three preferential directions, possibly perpendicular, the density of the yarns in each of the three directions being as high as desired and in particular perfectly homogeneous in each of these three directions. It will be noted that the term "yarn" used in the present application denotes a yarn, thread, fibre or wick, the material constituting this yarn being equally well graphite, carbon, glass, silica, polyamide, polyimide, etc. .

The process described in French Pat. No. 2 408 676 consists in making a support mandrel of a material adapted to receive pins by direct implantation by pressure, in implanting on this mandrel rows of pins made of a filiform textile material prerigidified by impregnation of a hardenable resin, so as to define between the pins longitudinal and circumferential corridors, in disposing, by filling and by winding, longitudinal and circumferential yarns in the corridors thus defined in order to make successive superposed layers, in impregnating with resin then in polymerising the assembly thus obtained, and finally, in eliminating the support mandrel.

French Pat. No. 2 408 676 describes more precisely a process and a machine for implanting the pins on the surface of the mandrel. The filling and winding operations of the longitudinal and circumferential yarns in the corridors defined between the pins are then effected with the aid of a machine such as described in French Pat. No. 2 315 562 filed on June 26, 1975 in the name of the Commissariat à l'Energie Atomique.

With respect to the other known processes of the prior art, the process described in French Pat. No. 2 408 876 has the advantage of allowing the use of yarns pre-impregnated with resin ensuring a better distribution of the resin at the heart of the piece formed. In addition, this process enables pieces of three-dimensional material, of which the density of the yarns in each of the three directions may be controlled perfectly and may be as high as desired, to be obtained easily and relatively inexpensively.

Under certain particular conditions of use, and particularly in the case of the manufacture of pieces of revolution of which the generatrix is not rectilinear and has one or more concave parts, as is the case for example for electrical insulators made of silica fibres, the positioning of the longitudinal yarns in the corresponding corridors may present certain difficulties, particularly when the density of the pins is very high, i.e. when the width of the longitudinal corridors is particularly reduced. In fact, due to the concave form of the mandrel, the longitudinal yarns leave, over at least a part of their length, the corresponding corridors formed between the pins. If the width of the corridors is sufficient, the longitudinal yarns may be reintroduced into these corridors when the circumferential yarns are wound thereafter. However, this operation is delicate and complicates manufacture. In addition, when the width of the longitudinal corridors is smaller, it becomes virtually impossible to reintroduce the corresponding yarns in these corridors.

It is an object of the invention to provide a process for manufacturing three-dimensional pieces of revolution constituting an improvement to the process described and claimed in French Pat. No. 2 408 676 and particularly enabling pieces of revolution to be made of which the generatrix has at least one concave part, whatever the density of the pins covering the mandrel. In addition, although the invention is particularly adapted to manufacturing three-dimensional pieces from a mandrel on which pins have been implanted by pressure as taught by French Patent application No. 2 408 676, it is not limited to this type of mandrel provided with pins. In fact, the invention is also applicable to the case of the pins being made directly on the mandrel by machining thereof. However, this latter technique presents various drawbacks such as the cost and duration of machining, the limitation that it implies in the density of the pins and the risks of delamination that it involves. Consequently, the technique of implanation of the pins by pressure, or an equivalent technique, will preferably be chosen within the scope of the present invention.

According to the invention, a process for manufacturing pieces of revolution made of three-dimensional material of which the generatrix has at least one concave part is therefore proposed, said process consisting in making a support mandrel, provided with rows of pins defining therebetween longitudinal corridors and circumferential corridors, in disposing, by winding and by filling, superposed layers of yarns in said corridors, in densifying the assembly thus obtained and, finally, in eliminating the support mandrel, said process being characterised in that the longitudinal yarns are deposited in the corresponding corridors and these yarns are maintained in the corridors at the level of said concave part.

According to a preferred embodiment of the invention, the longitudinal yarns are maintained in the corresponding corridors by winding at least one yarn in at least one of the circumferential corridors located at the level of said concave part. The longitudinal yarn which is disposed in one of the longitudinal corridors is preferably held provisionally by means of a retractable member before maintaining it by winding said yarn in the corresponding circumferential corridor.

The invention also relates to a machine for making pieces of revolution made of three-dimensional material of which the generatrix has at least one concave part.

According to the invention, this machine comprises means for supporting, in rotation, a mandrel provided with rows of pins defining therebetween longitudinal corridors and circumferential corridors, winding means and filling means adapted to deposit in said corridors layers of superposed yarns, this machine being characterised in that it further comprises at least one device for maintaining the longitudinal yarns, disposed at the level of said concave part and provided to apply the longitudinal yarn in the bottom of the concave part when this yarn is deposited in a longitudinal corridor by the filling means, and to maintain in this position the longitudinal yarns previously deposited in the other longitudinal corridors.

According to another feature of the invention, the device for maintaining the filling yarns comprises a retractable member holding the longitudinal yarn in the corresponding corridor after the passage of the filling means, and a winding system depositing at least one yarn in at least one of the circumferential corridors in order to maintain the longitudinal yarns previously deposited by the filling means in the other longitudinal corridors.

According to a further feature of the invention, the filling means comprise at least one heddle hook guided so as to move along a generatrix of the mandrel in a longitudinal corridor, means being provided to rotate the mandrel in a determined direction, and discontinuously, by a step equal to the distance between two longitudinal corridors each time the heddle hook reaches one of the ends of the mandrel, said retractable member being mobile radially with respect to the mandrel in order to allow passage of the heddle hook and tangentially in order to accompany the mandrel in its rotation when said member ensures the holding of a longitudinal yarn in the corresponding corridor.

According to a further feature of the invention, the winding system comprises a yarn supply system and a system for guiding the yarn disposed tangentially in recess with respect to the longitudinal corridor in which the heddle hook moves and in a circumferential corridor adjacent the one in which said retractable member is disposed. The holding device may then comprise a support assembly associated with a fixed part of the machine, said support assembly comprising means for radially and tangentially displacing the retractable member with respect to the mandrel and directly carrying the yarn guide system. The support assembly is preferably connected to the fixed part of the apparatus via adjusting means ensuring the radial and tangential positioning of the retractable member and of the winding system with respect to the concave part formed on the mandrel before the filling means are actuated.

The invention will be more readily understood on reading the following description with reference to the accompanying drawings, in which.

Figure 1:
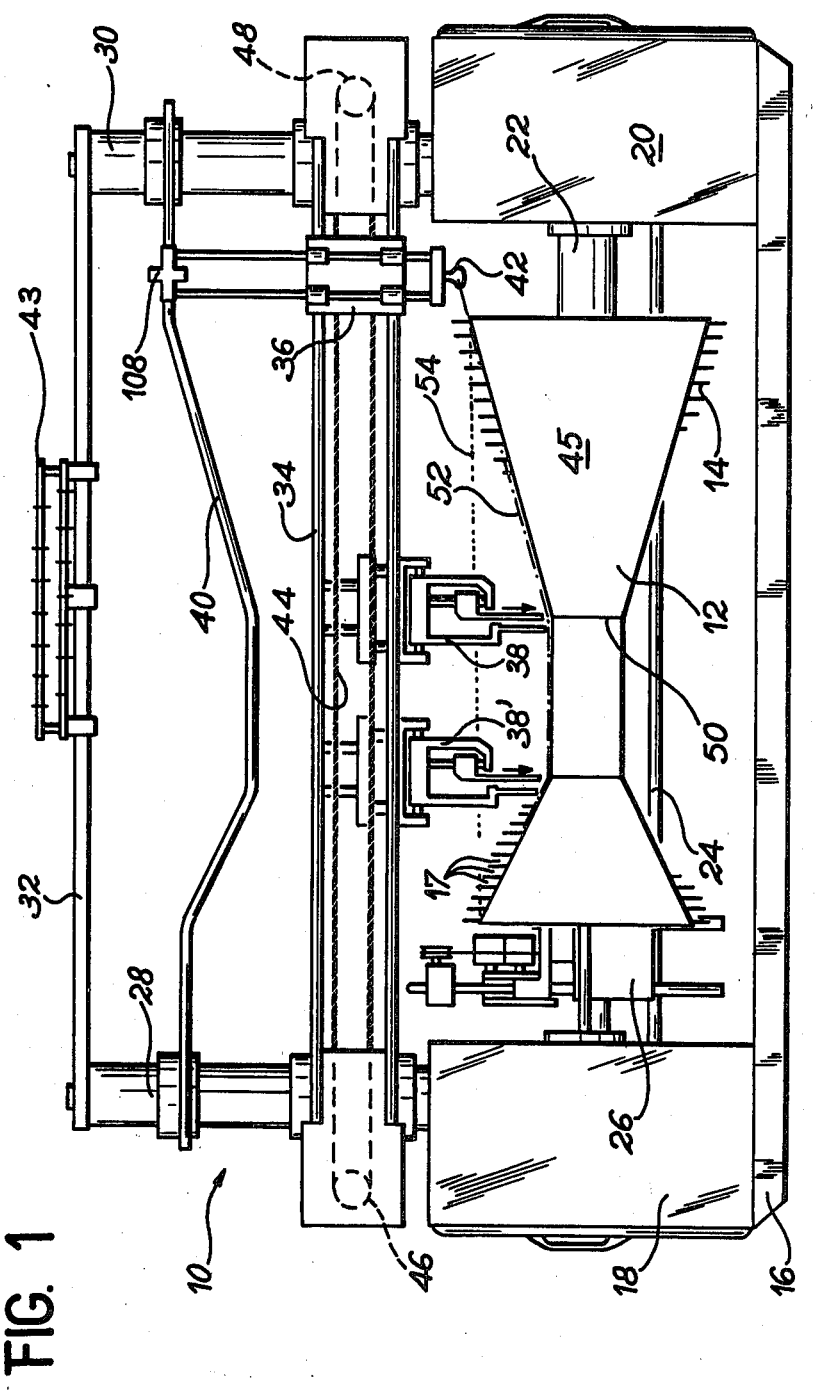
FIG. 1 is a front view of a machine for effecting winding and filling of superposed layers of yarns in corridors defined between pins carried by a mandrel, in order to manufacture pieces of revolution such as electrical insulators, this machine being made in accordance with the teaching of the present invention.

Referring now to the drawings, the machine 10 shown in FIG. 1 is particularly adapted to make pieces of revolution having a concave generatrix, such as, for example, electrical insulators. More precisely, the machine 10 is adapted to make, by winding and by filling, superposed layers of longitudinal and transverse yarns on a mandrel 12 bearing rows of pins 14 defining longitudinal and circumferential corridors.

Before the mandrel 12 is mounted on the machine 10, the pins 14 may be made on the mandrel directly by machining thereof. However, for reasons which have already been set forth, they are preferably implanted on the mandrel by pressure. This implantation may be effected, for example, with the aid of a machine such as the one described in French Pat. No. 2 408 676. Reference may be made to the text of this patent application for the conditions of this implantation and the particular structure of the machine. It will simply be observed here that the pins are preferably implanted in a radial direction with respect to the axis of the mandrel, but that they may also be inclined with respect to this direction. In addition, the pins are preferably constituted by yarns of determined length and diameter, rigidified by a prior impregnation of a heat-setting resin. Moreover, the material constituting the mandrel is chosen to allow both the direct implantation of these pins by simple pressure and the maintaining of these pins after implantation. This material must also resist the subsequent heat treatments, must have a sufficiently rigid and indeformable texture to maintain the three-dimensional body which surrounds it and must be easily destroyed after polymerisation of the assembly. To this end, rigid foams such as foams based on polyurethane or phenolic foams are preferably used. In a variant, the pins may also be directly machined on the mandrel.

The mandrel 12 provided with pins 14 obtained for example by means of these processes, is characterised in that the pins 14 are implanted in the form of longitudinal and circumferential rows which define therebetween longitudinal corridors 15 (FIG. 3) and circumferential corridors 17 (FIG. 1). The circumferential corridors may be constituted either by juxtaposed parallel corridors or by a single helical corridor, depending on the implantation of the pins.

As may be seen in FIG. 1 the machine 10 comprises a chassis 16 bearing at its ends left-hand and right-hand brackets 18 and 20 which project upwardly from the chassis 16. The brackets 18 and 20 support a horizontal shaft 22 on which the mandrel 12 is mounted. The shaft 22 is driven in rotation by means (not shown) constituted, for example, by an electric motor connected to the shaft 22 by a transmission system such as a system of pulleys and belts. The rotation of the shaft 22 and of the mandrel 12 must be discontinuous and by a determined step corresponding to the distance separating the longitudinal corridors 15 formed between the pins 14. To this end, the electric motor driving the shaft 22 will preferably be controlled by a conventional electric switching system (not shown) which ensures the functioning of all the machine.

The brackets 18 and 20 also carry one or more horizontal crosspieces 24 parallel to the axis of the shaft 22, on which a winding sub-assembly 26 moves. The sub-assembly 26 comprises one or more yarn supply reels, a heddle hook depositing the or each yarn in the winding corridors 17 formed on the mandrel 12, and means for tensioning these yarns. The displacement of the winding sub-assembly along the crosspiece 24 may be controlled by any means, and particularly by an endless screw of appropriate pitch.

Each of the brackets 18 and 20 bears in its upper part a vertical column 28, 30 respectively. The columns 28 and 30 are connected in their upper part by a beam 32 and they support a horizontal crosspiece 34 parallel to the axis of the shaft 22. The crosspiece 34 supports a filling sub-assembly 36 as well as two sub-assemblies or devices 38,38' for holding the filling yarn, one of which has been shown in perspective and to a larger scale in FIG. 2. The columns 28 and 30 also support a rail 40 disposed between the crosspiece 34 and the beam 32 and extending parallel to the top generatrix of the mandrel 12 located in the vertical plane passing through its axis. The filling sub-assembly 36 comprises a guiding system 108 which follows the rail 40 and this guiding system 108 is rigidly connected to a filling heddle hook 42.

Thus, the displacement of the filling sub-assembly 36 along the crosspiece 34 control the displacement of the heddle hook 42 in the upper filling corridor 14, along line 52 of FIG. 1. The filling sub-assembly 36 is supplied with yarn from one or more reels (not shown) through a tensioning system 43 borne by the beam 32. The reciprocating movement of the sub-assembly 36 along the crosspiece 34 may be controlled by any known means such as, for example, an electric motor (not shown) alternately displacing a belt or chain 44 in one or the other direction about two pulleys or gears 46, 48 disposed at each of the ends of the crosspiece 34.

Reference may usefully be made to the text of French Pat. No. 2 315 562, in order more readily to understand the structure and functioning of the winding sub-assembly 26 and of the filling sub-assembly 36 of the machine 10, said patent describing in detail a particular embodiment of a winding and filling machine comparable with the machine according to the present invention. The process for manufacturing a three-dimensional piece described in this French patent differs from the process according to the present invention in that the winding and filling are effected on a mandrel not provided with pins, the layers of yarns thus constituted being thereafter sewn by means of an appropriate device. In addition, no device comparable with the holding sub-assembly 38 is described in this patent.

As shown in FIG. 1, the invention relates more especially to the manufacture of pieces of revolution made of three-dimensional material of which the generatrix has at least one concave part. Thus, in the example shown, the piece to be made is an electrical insulator which comprises two truncated parts 45 and 49 of which the rectilinear generatrices are inclined in reverse direction with respect to the axis of the mandrel, and a cylindrical part 47 disposed between the ends of smaller diameter of the truncated parts 45 and 49, so that these three parts 45, 47 and 49 placed end to end define a concave external surface. The generatrix of the mandrel 12 is therefore concave and has two singular points 50 and 50' opposite which the holding devices 38 and 38' respectively are disposed.

When a layer of filling yarns is made on the mandrel 12, the heddle hook 42 is guided by the cooperation of the guiding system 108 with the rail 40 along the line 52 parallel to the top generatrix of the mandrel 12, in a filling corridor 15 defined between the pins 14.

Due to the concave form of the outer surface of the mandrel 12, the or each filling yarn thus deposited in one of the longitudinal corridors 15 defined between the pins 14 then tends to escape from this corridor to take the rectilinear form shown at 54 in FIG. 1. When the circumferential density of the pins 14 is not very high, i.e. when the width of the filling corridors is relatively large, the filling yarns disposed along line 54 will easily go back to their position inside the longitudinal corridors 15 when the following layer of yarns will be wound by means of the sub-assembly 26 in the circumferential corridors 17. However, when the circumferential density of the pins 14 becomes high, i.e. when the width of the longitudinal corridors 15 is reduced, the return of the filling yarn into position in these longitudinal corridors becomes virtually impossible.

According to the invention, this drawback of the prior machines is avoided by means of the holding devices 38 and 38'. The device 38 will now be described in detail, with reference to FIG. 2, knowing that device 38' is identical to this device 38.

Figure 2:
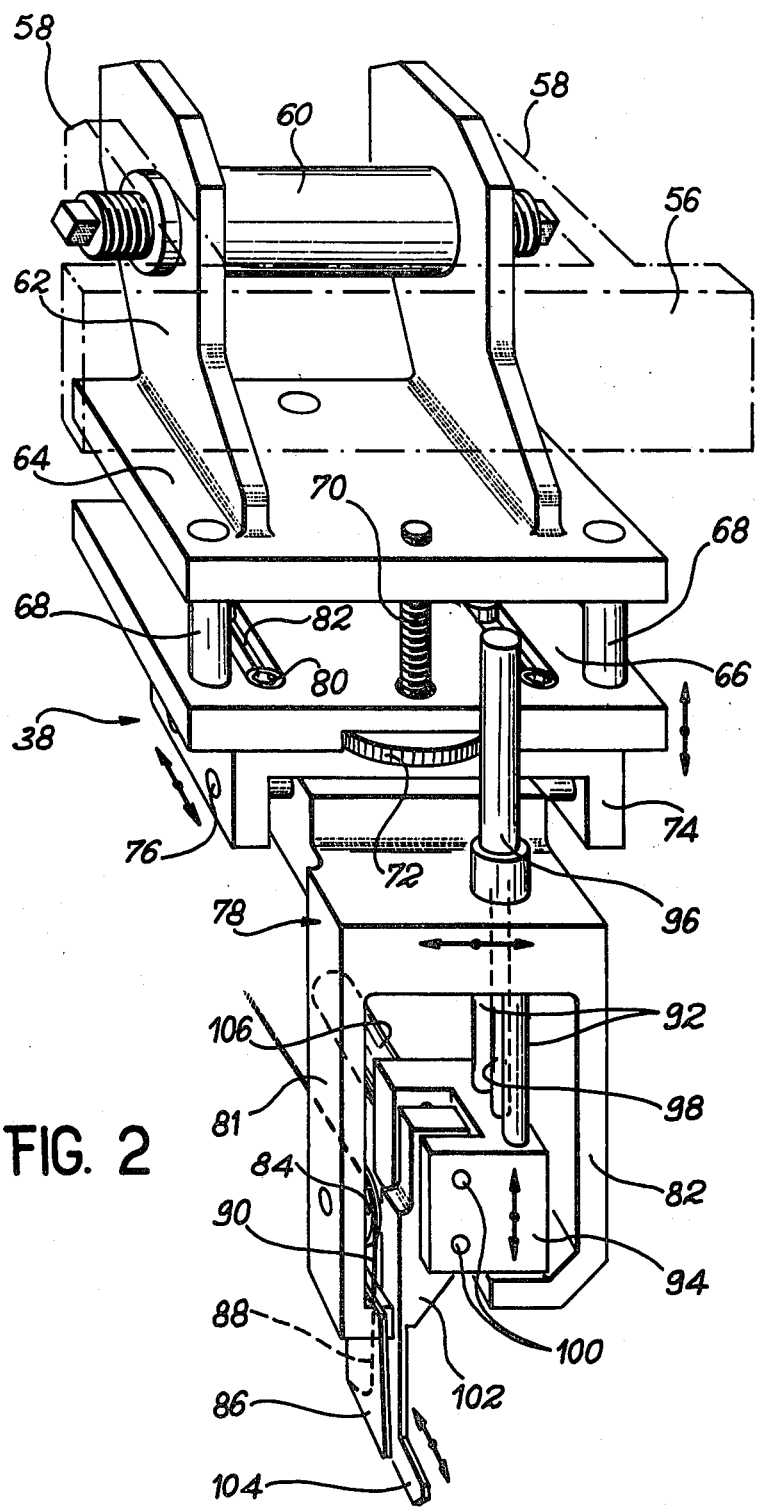
FIG. 2 is a view in perspective on a larger scale, which shows a device adapted to maintain in the corresponding corridors the longitudinal yarns deposited by the filling means of the machine shown in FIG. 1, when the generatrix of the piece to be made has at least one concave part.

As illustrated in FIG. 2, the holding device 38 comprises a frame support 56 fixedly mounted on the crosspiece 34, for example with the aid of bolts (not shown). The support 56 comprises two arms 58 pivotally supporting, via a pin 60, an articulated frame 62 comprising a plate 64 provided to be disposed in a substantially horizontal plane. The frame 62 is normally maintained in this position by a locking finger (not shown) carried by one of the arms 58 and penetrating in a corresponding hole formed in the frame 62. A plate 66 is disposed parallel to the plate 64 and therebelow. The plate 66 is connected to the plate 64 both by guide columns 68 and by an adjusting screw 70 making it possible to adjust by means of a wheel 72 the distance separating the plates 64 and 66. The lower plate 66 bears a support 74 provided with two bars 76 of axes parallel to the axis 60 and disposed normally in the same horizontal plane. A support assembly 78 is suspended from the bars 76. The assembly 78 and the support 74 are capable of moving in a horizontal plane perpendicularly to the axis 60 due to the cooperation of screws 80, or the like, fixed to the support 74, with grooves 82 formed in the plate 66. Tightening and loosening of the screws 80 allowing the displacement of the support assembly 78 and the support 74 in a direction perpendicular to the axis 60 may be effected either by inserting a key between the plates 64 and 66, or through openings (not shown) formed in the top plate 64. The support assembly 78 comprises two vertical arms 81 and 82 which project downwardly above the mandrel 12. The left-hand arm 81, with reference to FIG. 2, bears a pulley 84 disposed vertically above a heddle hook 86 in which is mounted a guide 88 provided to deposit a yarn 90 in one of the winding corridors formed between the pins 14 on the mandrel 12, as will be seen hereinafter. The yarn 90 comes from a supply reel (not shown).

The right-hand arm 82 is bent towards the arm 81, at its lower end, to support, via two vertical columns 92, a head 94 capable of sliding vertically along the columns 92 under the action of a jack 96 borne by the support assembly 78. The rod 98 of the jack 96 is disposed between the columns 92. The sliding head 94 itself supports, via two horizontal columns 100, a yarn-lowering plate 102 of which the end, of reduced width, may penetrate in one of the circumferential corridors 17.

Figure 3:
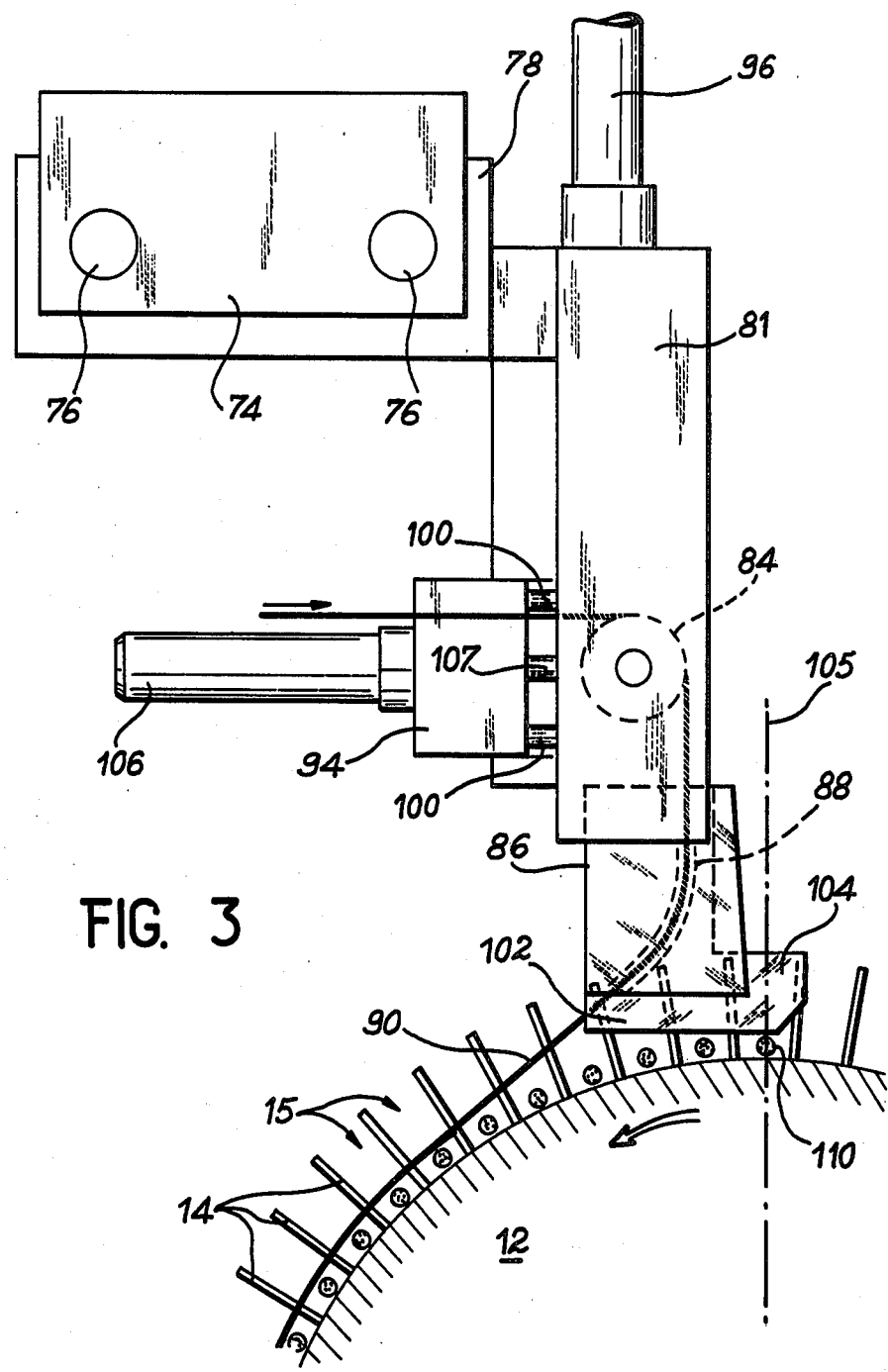
FIG. 3 is a schematic end view illustrating the functioning of the holding device shown in FIG. 2.

As illustrated in particular in FIG. 3, the lower end of the the plate 102 comprises a horizontal extension 104 disposed substantially at right angles with respect to the rest of the plate and normally placed in the vertical plane 105 passing through the axis of the mandrel 12. The plate 102 is capable of moving along the horizontal columns 100 under the action of a jack 106 fast with the head 94 and of which the rod 107 is disposed between the columns 100.

As illustrated in particular in FIG. 1, the devices 38 and 38' are disposed on the crosspiece 34 so that the yarn-lowering plate 102 and the heddle hook 86 of each of these devices is located in the immediate vicinity of the singular points 50 and 50' formed on the outer surface of the mandrel 12. Of course, if the outer surface of the mandrel 12 had only one singular point, only one device of the type of device 38 would be necessary. On the contrary, in the case of the outer surface of the mandrel 12 being a curved surface or a surface having more than two concave parts, it may be necessary to dispose on the crosspiece 34 at least three devices comparable with the device 38 at judiciously chosen points so as to avoid the filling yarn which is deposited by the heddle hook 42 escaping at any moment from the longitudinal corridors 15 defined between the pins 14. The heddle hook 86 and the yarn lowering plate 102 of each device 38 are also positioned in height and in depth with respect to the mandrel 12 with the aid of the adjusting means constituted by the wheel 72 and the screws 80. This positioning is as illustrated in FIG. 3, i.e. the heddle hook 86 and the plate 102 penetrate in two adjacent circumferential corridors 17 and the heddle hook 86 is slightly recessed with respect to the vertical plane 105, to allow the passage of the filling heddle hook 42 (FIG. 1), whilst the plate spans the top longitudinal corridor 15 through which the heedle hook 42 passes, in one position of the jack 106 and frees this corridor in the other position of this jack.

When a layer of longitudinal yarns is made on the mandrel 12 shown in FIG. 1, the machine 10 functions as follows:

Before the beginning of filling, the positioning of the mandrel 12 with respect to the different members of the machine 10 is effected with precision so that a longitudinal filling corridor 15 is disposed in the vertical plane passing through the axis of the mandrel. When the heddle hook 42 is not yet engaged in this filling corridor, as illustrated in FIG. 1, the plate 102 is in raised position and recessed with respect to the vertical plane passing through the axis of the mandrel. This position is opposite the one shown in FIGS. 2 and 3. Filling is effected by displacing the sub-assembly 36 along the crosspiece 34 alternately from left to right and from right to left under the action of an electric motor (not shown) and a drive system such as the belt or the chain 44. In the course of the displacement of the sub-assembly 36 along the crosspiece 34, the heddle hook 42 moves along the line 52 in the filling corridor 15 disposed vertically to the top part of the mandrel 12, due to the cooperation of the rail 40 with the guiding system 108.

According to the invention, as soon as the heddle hook 42 has slightly passed beyond the holding device 38 and deposited in the corresponding corridor a filling yarn along line 52, the device 38 is actuated, i.e. the part 104 of the yarn lowering plate 102 is placed above the top filling corridor 15 under the action of the jack 106 and lowers with the sliding head 94 under the action of the jack 96. Thus, the part 104 maintains the filling yarn 110 as soon as the latter has been deposited by the heddle hook 42, to prevent this yarn from escaping from the corresponding corridor. The device 38' is actuated in the same way when the heddle hook 42 passes beyond this device.

The devices 38 and 38' remain in this position until the heddle hook 42 reaches the other end of the mandrel 12. At that moment, under the impulse of an electric motor (not shown) the mandrel pivots with the shaft 22 through an angle such that the heddle hook 42 is located opposite the filling corridor 15 juxtaposed with respect to the corridor in which it has just deposited a yarn. Simultaneously to this movement of rotation of the mandrel 12, the yarn lowering plate 102 of each device 38,38' recoils under the pulse of the corresponding jack 106. The effect of this simultaneous movement of the mandrel 12 and of the plates 102 is to reduce the friction between the filling yarn which the heddle hook 42 has just deposited and the ends 104 of the plates. The movement of rotation of the mandrel 12 also leads to unwinding the yarn 90 over a length corresponding to the distance between two adjacent filling corridors 15.

As shown in particular in FIG. 3, the relative arrangement of the heddle hook 86 and the plate 102 of each of the devices 38 and 38' is such that the filling yarns deposited previously by the heddle hook 42 in the longitudinal corridors 15 begin to be held by the yarns 90 as soon as they arrive at the level of the rear part of the corresponding yarn-lowering plate 102, when the latter is in its most advanced position.

When a new layer of longitudinal yarns is firstly made by means of the filling sub-assembly 36, the free end of each of the yarns 90 is fixed to the mandrel 12 by any appropriate means, for example by hooking it to one of the pins 14. The simultaneous functioning of the filling sub-assembly 36 and of the holding devices 38 and 38' is thus continuous until all the filling corridors are filled with one or more yarns by means of the heddle hook 42. At that moment, the yarns 90 are cut and their second end may also be fixed to one of the pins 14 so as to maintain the layer of longitudinal yarns thus formed definitively. It will be noted that the synchronised control of the different parts of the machine according to the invention may be made by means of an electronic system of known type controlled by judiciously disposed contactors. Such a system is not part of the present invention and will not be described in detail here.

A layer of circumferential yarns may then be made by means of the winding sub-assembly 26 in a manner comparable with the one described in French Pat. No. 2 315 562. A large number of superposed layers of longitudinal and circumferential yarns may thus be disposed about the mandrel 12 in order to make a piece of the desired thickness. In known manner, when the desired number of layers has been made on the machine 10, the mandrel 12 covered with these different layers of yarns is dismantled and the whole is subject to impregnation by a heat-setting resin, then a polymerisation of this resin. The mandrel is then eliminated, generally by machining by milling or grinding along the axis thereof, so as to leave only the hollow body made of three-dimensional material. Pieces of electrical insulators or disconnecting switches for very high intensity currents may thus be obtained, as well as brake elements of automobile vehicles or of aircraft of particular types. The walls of the combustion chambers and pistons of automobile vehicles may also be made according to this process.

The circumferential and longitudinal yarns disposed on the mandrel 12 by the winding heddle hook (not shown) and by the filling heddle hook 42 are preferably constituted by yarns, filaments, fibres or wicks made of graphite, carbon, silica or glass. The yarns in the three directions may be of the same nature or of different nature, depending on the characteristics of the piece manufactured. In the processs according to the invention, these yarns may advantageously be preimpregnated with heat-setting resin, this substantially improving the distribution of the resin at the heart of the piece of the body formed.

It is clear from the foregoing description that the invention is more particularly applicable to producing hollow pieces of revolution made of three-dimensional fabric of which the generatrix has at least one concave part, whatever the density of the pins 14 borne by the mandrel 12.

The pieces thus obtained by successive winding and filling are either densified by means of an epoxy or phenolic resin or conventionally to obtain carbon-carbon substrates.

What is claimed is:

1. Process for manufacturing pieces of revolution made of three-dimensional material of which the generatrix has at least one concave part, said process consisting in making a support mandrel provided with rows of pins defining therebetween longitudinal corridors and circumferential corridors, in disposing superposed layers of yarns in said corridors by winding and by filling, in densifying the assembly thus obtained and finally in eliminating the support mandrel, wherein the longitudinal yarns are deposited in corresponding corridors, these yarns are maintained in the corridors at the level of said concave part, wherein the longitudinal yarns are maintained in the corresponding corridors by winding at least one yarn in at least one of the circumferential corridors located at the level of said concave part and wherein the longitudinal yarn which is disposed in one of the longitudinal corridors is temporarily maintained by means of a retractable member before it is maintained by winding said yarn in said corresponding circumferential corridor.

2. Machine for manufacturing pieces of revolution made of three-dimensional material of which the generatrix has at least one concave part, said machine comprising means for supporting, in rotation, a mandrel provided with rows of pins defining therebetween longitudinal corridors and circumferential corridors, winding means and filing means adapted to deposit in said corridors superposed layers of yarns, wherein said machine comprises, in addition, at least one device for maintaining the longitudinal yarns, disposed at the level of said concave part and provided to apply the longitudinal yarn in the bottom of the concave part when this yarn is deposited in a longitudinal corridor by the filling means, and to maintain in this position the longitudinal yarns deposited previously in the other longitudinal corridors wherein the device for maintaining the filling yarns comprises a retractable member ensuring the holding of the longitudinal yarn in the corresponding corridor after the passage of the filling means, and a winding system depositing at least one yarn in at least one of the circumferential corridors in order to maintain the longitudinal yarns previously deposited by the filling means in the other longitudinal corridors.

3. The machine of claim 2, wherein the filling means comprise at least one heddle hook guided so as to move along a generatrix of the mandrel in a longitudinal corridor, means being provided to rotate the mandrel in a determined direction and discontinuously by a step equal to the distance between two longitudinal corridors each time the heddle hook reaches one of the ends of the mandrel, said retractable member being mobile radially with respect to the mandrel in order to allow passage of the heddle hook and tangentially in order to accompany the mandrel in its rotation when said member holds a longitudinal yarn in the corresponding corridor.

4. The machine of claim 3, wherein the winding system comprises a yarn supply system and a system for guiding the yarn disposed tangetially in recess with respect to the longitudinal corridor in which the heddle hook moves and in a circumferential corridor adjacent the one in which said retractable member is disposed.

5. The machine of claim 4, wherein the maintaining device comprises a support assembly associated with a fixed part of the machine, said support assembly comprising means for radially and tangentially displacing said retractable member with respect to the mandrel and directly carrying the system for guiding the yarn.

6. The machine of claim 5, wherein the support assembly is connected to the fixed part of the apparatus via adjusting means ensuring the radial and tangential positioning of the retractable member and of the winding system with respect to the concave part formed on the mandrel before the winding means are actuated.

* * * * *